United States Patent [19]
Duret

[11] 4,293,735
[45] Oct. 6, 1981

[54] NODAL STRUCTURE SWITCHING NETWORK

[76] Inventor: Christian H. Duret, 6, rue de l'Epargne, Chatillon, France, 92320

[21] Appl. No.: 52,764

[22] Filed: Jun. 28, 1979

[30] Foreign Application Priority Data

Jun. 29, 1978 [FR] France .................. 78 19506

[51] Int. Cl.³ .............................................. H04Q 3/42
[52] U.S. Cl. ............................ 179/18 GE; 340/166 R
[58] Field of Search .......... 179/18 G, 18 GE, 18 GF, 179/18 EA; 340/166 R

[56] References Cited

U.S. PATENT DOCUMENTS 3,916,124 10/1975 Joel, Jr. .................. 179/18 GE
4,173,713 11/1979 Giesken et al. ............ 179/18 EA

FOREIGN PATENT DOCUMENTS 2538656 3/1977 Fed. Rep. of Germany ... 179/18 G
307532 8/1971 U.S.S.R. ...................... 179/18 GE Primary Examiner—Thomas W. Brown
Attorney, Agent, or Firm—Abraham A. Saffitz

[57] ABSTRACT

Switching network unit formed of a plurality of N identical elementary nodal switching networks having addresses from O to (N−1). If N is chosen smaller than or equal to $f^p$, f and p being two predetermined integers, each elementary nodal switching network is connected to 2p other elementary nodal switching networks through internodal links. The interconnection pattern allows the switching network capacity to be increased nodal switching network by nodal switching network. When adding to the unit an additional nodal switching network, p internodal links are cut out and the free ends thus obtained are connected to the additional nodal switching network.

3 Claims, 8 Drawing Figures

| | i | $i_0$ k=0 | $i_1$ k=1 | $i_2$ k=2 | $i_3$ p=3, k=0 | $i_4$ p=3, k=1 | $i_5$ p=3, k=2 |
|---|---|---|---|---|---|---|---|
| N = 23 | 0 | 1 | 2 | 6 | – | – | – |
| | 1 | 2 | 3 | 7 | – | – | – |
| | 2 | 3 | 4 | 8 | – | – | – |
| | 3 | 4 | 5 | 9 | – | – | – |
| | 4 | 5 | 6 | 10 | – | – | – |
| | 5 | 6 | 7 | 11 | – | – | – |
| | 6 | 7 | 8 | 12 | – | – | – |
| | 7 | 8 | 9 | 13 | – | – | – |
| | 8 | 9 | 10 | 14 | – | – | – |
| | 9 | 10 | 11 | 15 | – | – | – |
| | 10 | 11 | 12 | 16 | – | – | – |
| | 11 | 12 | 13 | 17 | – | – | – |
| | 12 | 13 | 14 | 18 | – | – | – |
| | 13 | 14 | 15 | 19 | – | – | – |
| | 14 | 15 | 16 | 20 | – | – | – |
| | 15 | 16 | 17 | 21 | – | – | – |
| | 16 | 17 | 18 | 22 | – | – | – |
| | 17 | 18 | 19 | – | – | – | – |
| | 18 | 19 | 20 | – | – | – | 0 |
| | 19 | 20 | 21 | – | – | – | 1 |
| | 20 | 21 | 22 | – | – | – | 2 |
| | 21 | 22 | – | – | – | – | 3 |
| | 22 | – | – | – | 0 | 0 | 4 |
| | | | | | | 1 | 5 |

FIG.3

| i | $i_0$ k=0 | $i_1$ k=1 | $i_2$ k=2 | $i_3$ p=3, k=0 | $i_4$ p=3, k=1 | $i_5$ p=3, k=2 |
|---|---|---|---|---|---|---|
| 0 | 1 | 3 | 9 | - | - | - |
| 1 | 2 | 4 | 10 | - | - | - |
| 2 | 3 | 5 | 11 | - | - | - |
| 3 | 4 | 6 | 12 | - | - | - |
| 4 | 5 | 7 | 13 | - | - | - |
| 5 | 6 | 8 | 14 | - | - | - |
| 6 | 7 | 9 | 15 | - | - | - |
| 7 | 8 | 10 | 16 | - | - | - |
| 8 | 9 | 11 | 17 | - | - | - |
| 9 | 10 | 12 | 18 | - | - | - |
| 10 | 11 | 13 | 19 | - | - | - |
| 11 | 12 | 14 | 20 | - | - | - |
| 12 | 13 | 15 | 21 | - | - | - |
| 13 | 14 | 16 | 22 | - | - | - |
| 14 | 15 | 17 | - | - | - | 6 |
| 15 | 16 | 18 | - | - | - | 7 |
| 16 | 17 | 19 | - | - | - | 8 |
| 17 | 18 | 20 | - | - | - | 0 |
| 18 | 19 | 21 | - | - | - | 1 |
| 19 | 20 | 22 | - | - | - | 2 |
| 20 | 21 | - | - | - | 0 | 3 |
| 21 | 22 | - | - | - | 1 | 4 |
| 22 | - | - | - | 0 | 2 | 5 |

| i | $i_0$ k=0 | $i_1$ k=1 | $i_2$ k=2 | $i_3$ p=3, k=0 | $i_4$ p=3, k=1 | $i_5$ p=3, k=2 |
|---|---|---|---|---|---|---|
| --- | --- | --- | --- | --- | --- | --- |
| --- | --- | --- | --- | --- | --- | --- |
| 13 | 14 | 16 | 22 | - | - | - |
| 14 | 15 | 17 | 23 | - | - | - |
| 15 | 16 | 18 | - | - | - | 7 |
| 16 | 17 | 19 | - | - | - | 8 |
| 17 | 18 | 20 | - | - | - | 0 |
| 18 | 19 | 21 | - | - | - | 1 |
| 19 | 20 | 22 | - | - | - | 2 |
| 20 | 21 | 23 | - | - | - | 3 |
| 21 | 22 | - | - | - | 1 | 4 |
| 22 | 23 | - | - | - | 2 | 5 |
| 23 | - | - | - | 0 | 0 | 6 |

N=24

NODAL STRUCTURE SWITCHING NETWORK

BACKGROUND OF THE INVENTION

1. Field of the Invention

The present invention concerns a switching system architecture with improved growth characteristics. This architecture can be used for time or space division switching. The system can be expanded between a hundred and several tens of thousands subscriber lines with only one basic equipment. This equipment is an elementary nodal switching network or a node containing all the hardware involved during a call. A node can carry calls from (or to) its own terminals and transit calls from other nodes. Each node is linked with the same limited number of other nodes through internodal links and during growth additions a small number of links are changed. Hardware troubles are limited to one node and little or none affect the overall blocking characteristics of the network.

Each elementary nodal switching network is capable of handling with its own subscriber and trunk traffic together with the internodal traffic. This nodal structure is therefore very different from the graded structure of the specialized switching stations which form the conventional telecommunication network with their different switching levels: satellite exchange, central exchange, toll exchange, transit exchange, international exchange, . . . and from the graded structure in the switching units: proper in which the subscriber selection stage and the group selection stage have different functions.

The advantages of a nodal structure of identical elementary nodal switching networks over a conventional switching network system are the following:

It is possible to attain a high rate up to 100 of the maximum to the minimum capacity of the switching network unit formed by the elementary nodal switching networks;

Capacity extensions can be made by small increases, say of 1% of the old capacity without noticeably changing the structure of the system already built;

Breakdown in a node only affects a limited number of subscriber lines or trunks.

2. Description of the Prior Art

A three-dimensional nodal structure for a switching network unit has already been proposed in the two publications: "Comparison of Different Connecting Networks: Grid Connecting Networks and its Control with Microprocessors" by K. RAHKO, International Conference on Communications, Vol. II, Pages 22-15 to 22-19, San Francisco, June 16-18, 1975 and "Nodal Switching Networks"by A. E. JOEL, International Telegraphic Congress, Pages 312-1 to 312-8, Stockholm, 1973. Switching nodes are arranged in rows and in superimposed planes. The number of internodal links ending at each node is the same for all nodes and the mean distance between one node and all other nodes is the same whichever the node (the term "distance" signifies the number of nodes inserted between an incoming and an outgoing nodes). This is obtained by connecting either the nodes of the last row of each plane to the nodes of the first row of said plane or the nodes of the last plane to the nodes of the first plane.

In the prior art arrangements, extension of the switching network capacity is only possible row by row or plane by plane. Extension node by node is not allowed by these arrangements.

SUMMARY OF THE INVENTION

The object of the present invention is to provide a switching network unit formed of a plurality of identical elementary switching networks or nodes whose capacity can be increased node by node by cutting out the internodal links between several pairs of nodes of the unit and connecting the free ends of these links thus cut out to the added node.

How to determine the parameters of the switching unit, namely the number of nodes N
the base of the network f
the dimension of the network P
the number of channels per nodal link q will now be explained in relation to the following article "A Nodal Structure Switching Network" by C. DURET, International Switching Symposium, Paris 7-11 May 1979.

Let N designate the maximum number of nodes, f the base of the nodal network and p the order of the network dimension (p=3 for a cubic network; p=2 for a plane network). Then, we have $$N = f^p \text{ whence } F = \sqrt[p]{N}$$

The mean distance $\bar{d}$ between the nodes is $$\bar{d} \simeq \frac{pf}{4} = \frac{pN^{1/p}}{4}$$

(see formula (7) of the above-mentioned article) and the minimal distance $\bar{d}$ in function of p is obtained by differentiating the value of $\bar{d}$ and equaling the same to zero $$\frac{d\bar{d}}{dp} = \tfrac{1}{4}N^{1/p}\left(1 - \frac{\log_e N}{p}\right)$$

$$p = \log_e N$$

The total number of channels in the internodal links is $$M = N_{pq}$$

(see formula (9) of the above-mentioned article) where $$q = 2T_E(\bar{d}/p)$$

and $T_E$ is the traffic in erlangs transmitted by a node through its internodal links. Let us assume that $T_E = 0.075a$ where a is the number of subscribers per node and $a = 200$. Then $$q = 2 \times 0.075 \times a \times (\bar{d}/p)$$

Let us take for example N=75 elementary nodal switching networks having each a=200 subscribers connected thereto which form together a switching unit for 15000 subscribers. We find $$p = \log_e 75 \simeq 4.32 \simeq 4$$
$$f = \sqrt[4]{75} \simeq 3$$
$$\bar{d} = \frac{pf}{4} \simeq 3$$

-continued $$q = 2T_E \frac{\overline{d}}{p} = 20$$

$$M = Npq = 75 \times 4 \times 20 = 6000.$$

According to its most general definition, the switching network unit comprises a plurality of N elementary nodal switching networks, N being at most equal to the product $$N \prod_{m=1}^{m=p} f_m, \ 1 \leq m \leq p$$

of p integers $f_1$ to $f_p$ each of which is at least equal to 2, each nodal switching network being connected by external lines to input and output terminals of the switching network unit and by internodal links to certain of the other nodal switching networks. If i ($0 \leq i \leq (N-1)$) designates the address of an elementary nodal switching network, each elementary nodal switching network is selectively connected through internodal links in the following way:

if the elementary nodal switching network has an address i which is smaller than or equal to:

$$N - 1 - \prod_{m=0}^{m=k} f_m \quad (1)$$

(where $f_O$ is taken equal to 1), it is connected to all the elementary nodal switching networks having addresses:

$$i_k = i + \prod_{m=0}^{m=k} f_m \quad (2)$$

if the elementary nodal switching network has an address i which is higher than or equal to:

$$N - \prod_{m=0}^{m=k} f_m \quad (3)$$

it is connected to the elementary nodal switching network having the address:

$$i_{p+k} = (i + 1) \text{ modulo } \prod_{m=0}^{m=k} f_m \quad (4)$$

where k is any one of the integers from 0 inclusive to (p−1) inclusive.

EXAMPLE No. 1

Let us take  N = 23
           p = 3
           $f_0 = 1$    $f_1 = 2$   $f_2 = 3$   $f_3 = 4$ $$\prod_{m=1}^{m=3} (3) = \prod_{m=1}^{m=3} f_m = 24$$

$$\prod_{m=0}^{m=0} (o) = 1 \quad \prod_{m=0}^{m=1} (1) = 2 \quad \prod_{m=0}^{m=2} (2) = 6$$

N − π(o) − 1 = 21    N − π(o) = 22
N − π(1) − 1 = 20    N − π(1) = 21
N − π(2) − 1 = 16    N − π(2) = 17.

If k=0 and i≦21, the elementary nodal switching network of address i is connected to elementary nodal switching networks of addresses:

$$i_k = i + 1.$$

Thus, the connection rule is given by the first column of the table of FIG. 2.

If k=1 and i≦20 the elementary nodal switching network of address i is connected to elementary nodal switching networks of addresses:

$$i_k = i + 2.$$

Thus the connection rule is given by the second column of the table of FIG. 2.

If k=2 and i≦16, the elementary nodal switching network of address i is connected to elementary nodal switching networks of addresses $$i_k = i + 6.$$

Thus the connection rule is given by the third column of the table of FIG. 2.

If k=0 and i≧22, the elementary nodal switching network of address i is connected to the elementary nodal switching network of address $$i_{p+k} = i+1, \text{ modulo } 1.$$

Thus the connection rule is given by the fourth column of the table of FIG. 2.

If k=1 and i≧21, the elementary nodal switching network of address i is connected to the elementary nodal switching network of address $$i_{p+k} = i+1, \text{ modulo } 2.$$

Thus the connection rule is given by the fifth column of the table of FIG. 2.

If k=2 and i≧17, the elementary nodal switching network of address i is connected to the elementary nodal switching network of address $$i_{p+k} = i+1, \text{ modulo } 6.$$

Thus the connection rule is given by the sixth column of the table of FIG. 2.

Equations (2) and (4) cannot be used simultaneously for each value of k, that is to say that the elementary nodal switching network of address i cannot be connected at the same time to an elementary nodal switching network of address $i_k$ and to an elementary nodal switching network of address $i_{p+k}$.

The integer k may take any of the consecutive values from 0 to (p−1), that is to say p values. Relationships (2) and (4) determine p elementary nodal switching networks to be connected to any given elementary nodal switching network. Nevertheless, since each address is firstly chosen as the address i of an originating elementary nodal switching network and secondly as the address $i_k$ or $i_{p+k}$ of a terminating elementary nodal switching network, each elementary nodal switching network is always the point of convergence of 2p internodal links. For example, it can be seen in the connection table of FIG. 2 that elementary nodal switching network No. 8 is connected to elementary nodal switching networks Nos. 2, 6, 7, 9, 10 and 14.

Whatever the number N of elementary nodal switching networks in the network unit, the elementary nodal switching network of address (N−1) is always connected to the elementary nodal switching network of address 0, because N−1 is equal to N−π(0) and equation (4) then gives:

$$i_{p+k} = N \text{ modulo } 1 = 0.$$

EXAMPLE No. 2

The p integers $f_1$ to $f_p$ are all taken equal to the same value f. The connection rule then is expressed by:

If address i is smaller than or equal to $N-1-f^k$, the elementary nodal switching network of address i is connected to all the elementary nodal switching networks of addresses:

$$i_k = i + f^k. \tag{5}$$

If address i is higher than or equal to $N-f^k$, the elementary nodal switching network of address i is connected to the elementary nodal switching network of address:

$$i_{p+k} = i+1, \text{ modulo } f^k. \tag{6}$$

The advantages of the arrangement of the invention are the following:

the distribution of the switching traffic between the elementary nodal switching networks through the internodal connections is improved; and the calculation of the internodal connection pattern which is necessarily carried out by computer when the number of elementary nodal switching networks is large is greatly simplified.

BRIEF DESCRIPTION OF THE DRAWINGS

The invention together with the characteristics and advantages thereof will be best understood by disclosing particular embodiments of the same. The disclosure will be made in relation to the accompanying drawings in which:

FIG. 3 shows the nodal switching network connection table of the switching network unit of FIG. 1 in the case where N=23;

FIG. 5 shows the nodal switching network connection table of a switching network unit having N=24 elementary nodal switching networks;

DESCRIPTION OF THE PREFERRED EMBODIMENTS

Figure 1:
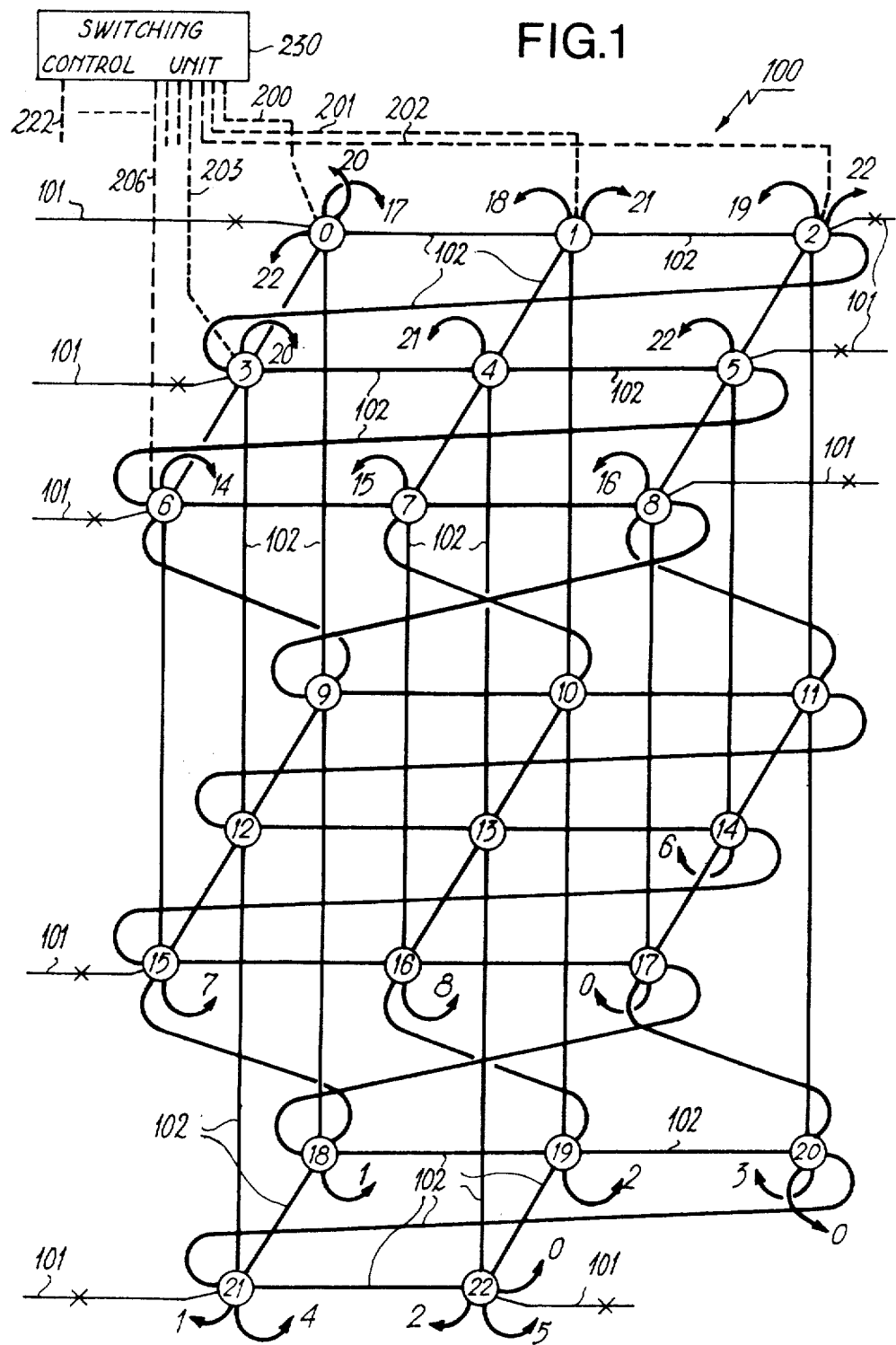
FIG. 1 is a block diagram of a switching network unit according to the invention showing the elementary nodal switching networks and the internodal connection links therebetween.

Referring first to FIG. 1, there is shown a switching network unit 100 and a switching control unit 230.

The switching network unit 100 comprises 23 elementary nodal switching networks numbered from 0 to 22 inclusive, multichannel external links 101 connecting the elementary nodal switching networks to the inputs and outputs of the switching network unit and multichannel internodal links 102 connecting therebetween the elementary nodal switching networks. Links 101 are drawn in thin lines and links 102 in thick lines.

Control unit 230 respectively controls elementary nodal switching networks 0 to 22 through control leads 200 to 222 drawn in dotted lines. Only some of the control leads are drawn in order not to overburden the drawing. If the elementary nodal switching networks are space division switching networks, control unit 230 controls the connection (or disconnection) between specific incoming and outgoing lines. If the elementary nodal switching networks are multiplex time division switching networks, control unit 230 controls the connection (or disconnection) between specific time slots in incoming and outgoing MTD highways.

In order to facilitate the reading of the block diagram of FIG. 1, only a few external links 101 and a few internodal links 102 are completely illustrated. But those internodal links which are not completely illustrated are at least represented as segments reduced to the parts which they originate from or terminate to. Each incomplete internodal link originating from a given elementary nodal switching network is represented as a curved arrow bearing the number of the elementary nodal switching network at which it terminates. For instance, internodal link 102 from elementary nodal switching network 7 to elementary nodal switching network 15 is represented by a curved arrow originating at 7 and marked 15 and by a curved arrow originating at 15 and marked 7.

Figures 2, 7:
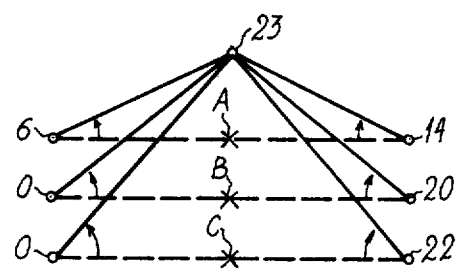
FIG. 2 already disclosed in the introductory part of the description shows the nodal switching network connection table of a switching network unit according to the invention in the case where N=23.
FIG. 7 is a diagram showing the links to be cut out and the links to be established when the number of nodes increases by one unit.

A block diagram of an elementary nodal switching network is given hereunder in FIG. 7. With regard to the switching control unit 230, it is of known type and need not be described because the invention basically lies in the arrangement of the internodal connections of the elementary nodal switching networks therebetween.

In the switching network unit of FIG. 1, we have:
f=3;
p=3;
f=27;
N=23;
k=0 or 1 or 2.

Relations (5) and (6) become respectively:

$$i_k = i + 3^k \tag{7}$$

$$i_{p+k} = i+1, \text{ modulo } 3^k. \tag{8}$$

Equation (7) applies when:

$$i \leq 22 - 3^k$$

and equation (8) when:

$$i \geq 23 - 3^k.$$

The table of FIG. 3 gives, for each of the 23 values of the address i, the values of the addresses $i_0$, $i_1$, $i_2$, $i_3$, $i_4$ and $i_5$ of the elementary nodal switching networks to be connected to that of address i through an internodal link 102.

In FIG. 1, the internodal links are implemented according to the table of FIG. 3.

Figure 4:
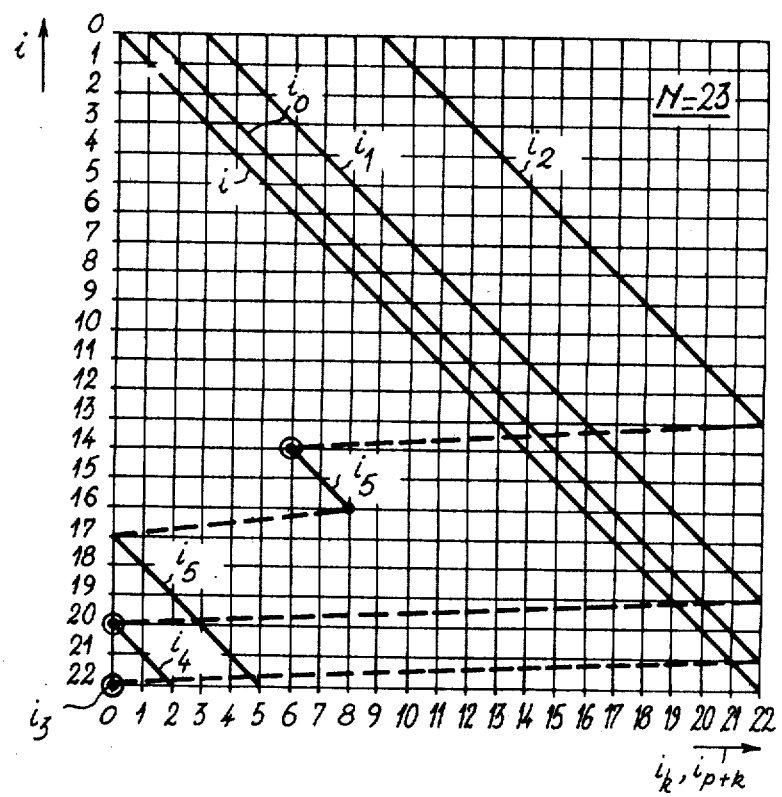
FIG. 4 is a matrix representation of the connection table of FIG. 3.

Referring now to FIG. 4, it represents in matrix form the internodal link pattern. The diagonal of the matrix is assigned to the addresses i and the rows and columns to addresses $i_k$ and $i_{p+k}$. It results that crosspoints represent internodal links between elementary nodal switching networks having as their addresses the coordinates of the crosspoints. Instead of discrete points, FIG. 4 represents straight lines passing through the said discrete points, except crosspoint $i_3$ which represents the internodal link between elementary nodal switching network of addresses 22 and 0 and which remains detached. The oblique dotted lines are junction lines between the three segments $i_2$ and $i_5$, $i_5$ being the continuation of $i_2$ and the two segments $i_1$ and $i_4$, $i_4$ being the continuation of $i_1$. In order to find all the internodal links connected to the elementary nodal switching network having a given address i represented by a crosspoint (i,i) of the diagonal of the matrix, one must follow the row passing through said crosspoint and take notice of the abscissae of the points of intersection of this row with the diagonals and the parallels to the diagonal, then follow the column passing through said crosspoint and take notice of the ordinates of the points of intersection of this column with the diagonal and the parallels to the diagonal. For example, the horizontal row passing through crosspoint (11,11) of the diagonal meets oblique line $i_0$ at abscissa 12, oblique line $i_1$ at abscissa 14 and oblique line $i_2$ at abscissa 20 and the vertical column passing through crosspoint (11,11) of the diagonal meets oblique line $i_0$ at ordinate 10, oblique line $i_1$ at ordinate 8 and oblique line $i_2$ at ordinate 2. Thus elementary nodal switching network of address 11 is linked to elementary nodal switching networks of addresses 2, 8, 10, 12, 14 and 20.

As other examples let us consider the elementary nodal switching networks of respective addresses 0 and 1. The first is linked to elementary nodal switching networks of addresses 1, 3, 9, 17, 20, 22 and the second is linked to elementary nodal switching networks of addresses 0, 2, 4, 10, 18 and 21. In this case, when following the column passing through the crosspoint (1,1), the intersection with $i_0$ (address 0) is above the crosspoint and the intersections with $i_5$ (address 18) and $i_4$ (address 21) are below the crosspoint.

One finds again that each elementary nodal switching network is linked to six other elementary nodal switching networks.

One will now refer to FIG. 5. It shows a table similar to the table of FIG. 3 except that the number of elementary nodal switching networks N is no longer 23 but is instead 24. In other words the table of FIG. 5 is obtained by adding an additional elementary nodal switching network to the 23 of FIG. 1. FIG. 5 moreover represents only the lower section of the table since the fourteen first lines of the tables of FIGS. 3 and 5 are the same.

Figure 6:
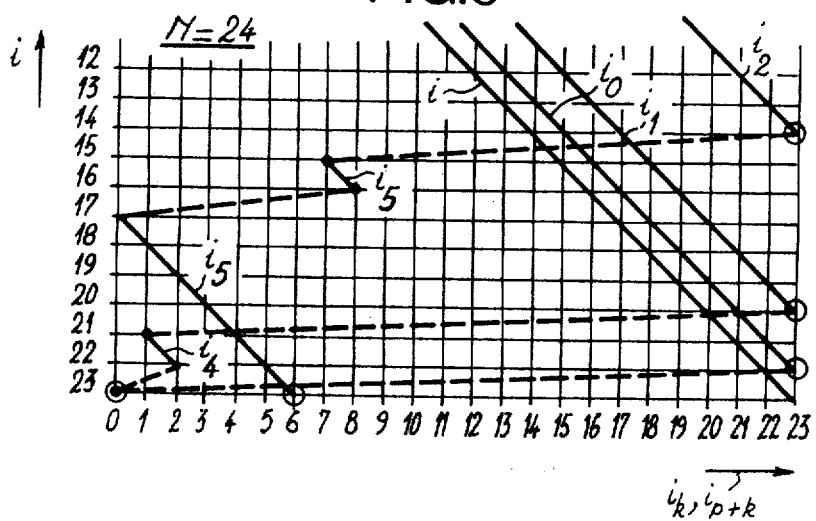
FIG. 6 is a matrix representation of the connection table of FIG. 5.

The matrix of FIG. 6 represents the table of FIG. 5 in the same manner as the matrix of FIG. 4 represented the table of FIG. 3. By comparing the two matrices, it can be seen that the switching network unit including N=24 elementary nodal switching networks differs from the switching network unit including N=23 elementary nodal switching networks by elimination of p=3 internodal links, namely internodal links 14-6, 20-0 and 22-0 (the corresponding crosspoints in FIG. 4 are surrounded by small circles) and by addition of 2p=6 internodal links, namely internodal links 14-23, 20-23, 22-23, 23-0, 23-0 and 23-6, i.e. the internodal links connecting to the others the additional elementary nodal switching network (the corresponding crosspoints in FIG. 6 are surrounded by small circles).

It is thus verified that it is sufficient to cut out p old internodal links and to add 2p novel internodal links for extending by one unit the number of elementary nodal switching networks.

It is to be noticed that the internodal links eliminated and the internodal links added are correlated. In FIG. 7 there is shown the eliminated link 14-6 cut out at A, 20-0 cut out at B and 22-0 cut out at C. The stub 6-A is connected to 23 and forms link 6-23; the stub O-B and O-C are connected to 23 and form together link 0-23; the stub 14-A is connected to 23 and forms link 14-23; the stub 20-B is connected to 23 and forms link 20-23 and the stub 22-C is connected to 23 and forms link 22-23. Thus three links are cut out forming six stubs which are connected to the new elementary nodal switching network 23.

Figure 8:
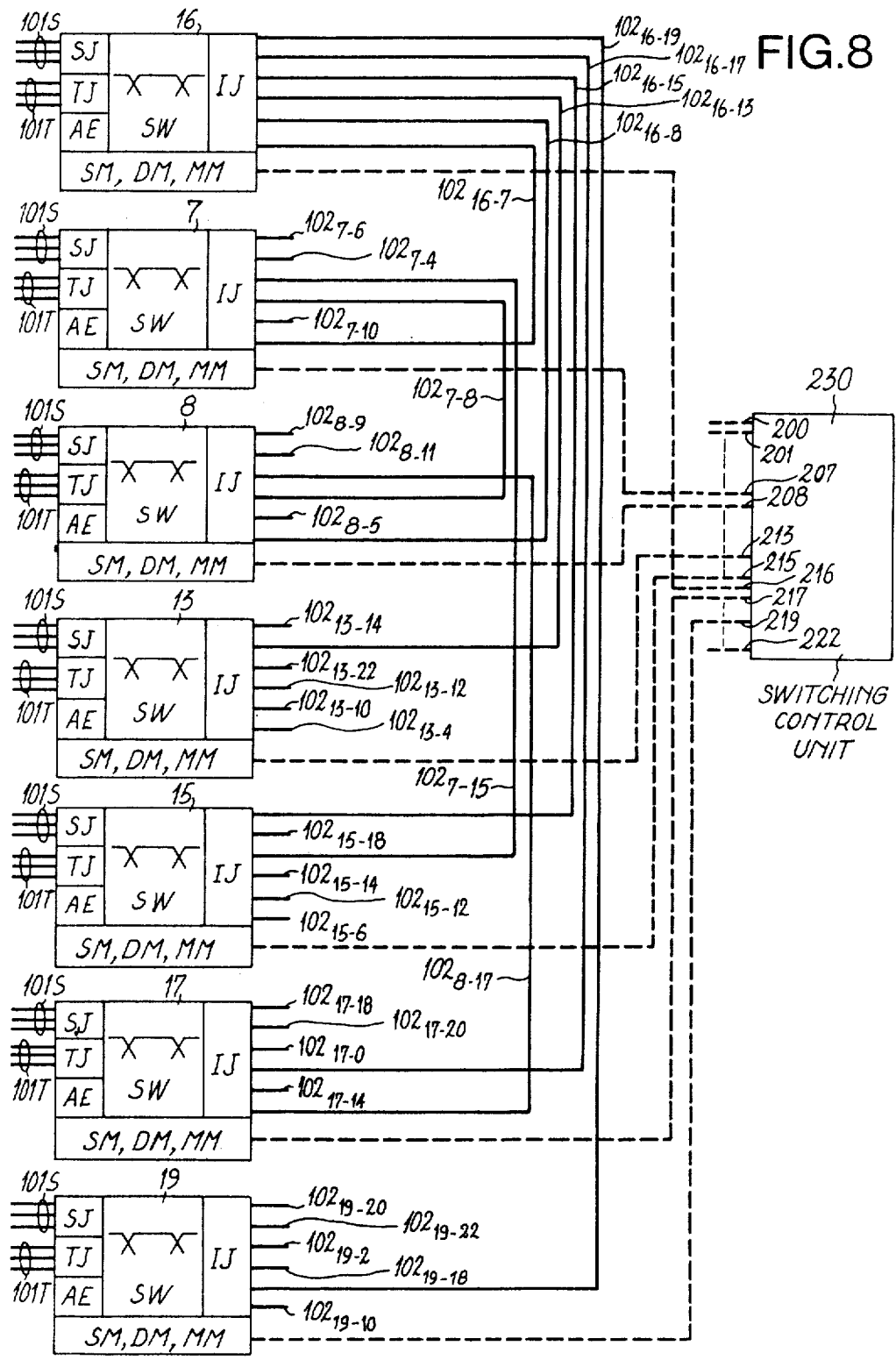
FIG. 8 represents a block diagram of a part of the switching network unit of FIG. 1.

Referring now to FIG. 8, it represents 7 elementary nodal switching networks, namely those of addresses 16, 7, 8, 13, 15, 17, 19, subscriber's lines 101 S and trunks 101 T originating from and terminating at said elementary nodal switching networks, internodal links $102_{16-7}$, $102_{16-8}$, $102_{16-13}$, $102_{16-15}$, $102_{16-17}$ and $102_{16-19}$ and controls leads 216, 207, 208, 213, 215, 217 and 219 connecting each elementary switching network to switching control unit 230.

Each elementary nodal switching network comprises subscriber's junctors SJ, trunk junctors TJ, auxiliary equipement AE (such as multifrequency code receivers, tone generators, . . . ), internodal junctors IJ (suchs as multifrequency code senders and receivers), a switching network proper SW, scanner means SM, distributor means DM and marker means MM.

Other functions than those performed by the elementary nodal switching network such as dialing code registering, translation, route finding, . . . are performed in the switching control unit 230. Additional explanations are unnecessary since the structure of the elementary nodal switching networks is conventional and well known by those skilled in the telephone art.

What I claim is:

1. A switching network unit for establishing interconnections amongst any of a plurality of termination circuits, said switching network unit comprising:

a plurality of N identical elementary node switching networks having consecutive addresses comprised between 0 inclusive and (N−1) inclusive, N being an integer smaller than or equal to $f^p$, f and p being predetermined integers, said termination circuits being connected to respective ones of said elementary node switching networks;

internode links connecting each of said elementary node switching networks to 2p other elementary node switching networks, the elementary node switching networks having addresses i smaller than or equal to $N-f^k-1$ being connected through said internode links to elementary node switching networks of addresses $i+f^k$ and the elementary node switching networks having addresses i greater than or equal to $N-f^k$ being connected through said internode links to elementary node switching networks of addresses $i+1$ (modulo $f^k$) where k is any integer including 0 and at most equal to p.

2. A switching network unit as set forth in claim 1 in which $p=3$.

3. A switching network unit for establishing interconnections amongst any of a plurality of termination circuits, said switching network comprising:

a plurality of N identical elementary node switching networks having consecutive addresses comprised between 0 inclusive and $(N-1)$ inclusive, N being an integer equal to $f^p$, f and p being predetermined integers, said addresses being arranged in $(p+1)$ address groups,

| | |
|---|---|
| address group No. 0 | $N-1$ alone |
| address group No. 1 | $N-f$ to $N-f-1$ |
| address group No. $(k-1)$ | $N-f^{(k-1)}$ to $N-f^{(k-2)}-1$ |
| address group No. k | $N-f^k$ to $N-f^{(k-1)}-1$ |
| -continued | |
| address group No. $(p-1)$ | $N-f^{(p-1)}$ to $N-f^{(p-2)}-1$ |
| address group No. p | $N-f^p=0$ to $N-f^{(p-1)}-1$ | and said termination circuits being connected to respective ones of said elementary node switching networks;

internode links connecting each of said elementary node switching networks to 2p other elementary node switching networks, the elementary node switching networks having addresses i lying in address groups No. $(k+1)$ to No. p being connected through said internode links to elementary node switching networks of addresses $i+f^k$ and the elementary node switching networks having addresses i lying in address groups No. k to No. 0 being connected through said internode links to elementary node switching networks of addresses $(i+1)$ (modulo $f^k$) where k is any integer including 0 and at most equal to p.

* * * * *